(12) United States Patent  (10) Patent No.: US 7,483,917 B2
Sullivan et al.  (45) Date of Patent: Jan. 27, 2009

(54) RISK MAPPING SYSTEM

(75) Inventors: Andrew Sullivan, Cork City (IE); Victor Sullivan, Cork City (IE); Diana Thompson, Cork (IE); Fergal O'Donovan, Carlow (IE); Sean Duane, Cork City (IE)

(73) Assignee: Industrial Interfaces Limited, Cork, County Cork (IE)

( * ) Notice: Subject to any disclaimer, the term of this patent is extended or adjusted under 35 U.S.C. 154(b) by 0 days.

(21) Appl. No.: 10/505,791

(22) PCT Filed: Feb. 27, 2003

(86) PCT No.: PCT/IE03/00029

§ 371 (c)(1),
(2), (4) Date: Nov. 26, 2004

(87) PCT Pub. No.: WO03/081470

PCT Pub. Date: Oct. 2, 2003

(65) Prior Publication Data

US 2005/0086227 A1  Apr. 21, 2005

(30) Foreign Application Priority Data

Feb. 27, 2002  (IR)  ................................ S2002/0152

(51) Int. Cl.
*G06F 17/30*  (2006.01)
(52) U.S. Cl. ...................... 707/104.1; 707/102; 707/10; 707/7
(58) Field of Classification Search ................. 707/100, 707/1, 102; 703/1; 434/72
See application file for complete search history.

(56) References Cited

U.S. PATENT DOCUMENTS

| | | | | |
|---|---|---|---|---|
| 6,590,496 B2* | 7/2003 | Peterson et al. | ............. | 340/522 |
| 6,604,126 B2* | 8/2003 | Neiman et al. | ............. | 709/203 |
| 6,701,281 B2* | 3/2004 | Satoh et al. | ................. | 702/182 |
| 6,915,211 B2* | 7/2005 | Kram et al. | .................... | 702/5 |
| 7,031,838 B1* | 4/2006 | Young et al. | .................... | 702/2 |
| 7,134,088 B2* | 11/2006 | Larsen | ....................... | 715/765 |
| 2001/0027389 A1* | 10/2001 | Beverina et al. | ............. | 703/22 |
| 2004/0103431 A1* | 5/2004 | Davenport et al. | ............ | 725/33 |

OTHER PUBLICATIONS

Conley et al, URISA 98 Annual Conf Proc, XP002249158, pp. 123-130, Integrating Fire Operations with IT and GIS: GIS . . . .

(Continued)

*Primary Examiner*—Tim T Vo
*Assistant Examiner*—Dangelino N Gortayo
(74) *Attorney, Agent, or Firm*—Jacobson Holman PLLC

(57) ABSTRACT

A risk mapping system (1) for use in crises management comprises a database (2) having a plurality of risk maps and hazard data associated with each risk map stored thereon. The database is accessible by one or more of personal computers (3), laptops (4) and hand held devices (5) by way of communication channels (6). The risk maps stored on the database comprise three dimensional graphical representations of specific locations and for each specific location having a three dimensional graphical representation there are provided a plurality of three dimensional, graphical representations from different aspects of that location. The hazard data is represented by way of a hazard icon superimposed on the risk map.

19 Claims, 9 Drawing Sheets

OTHER PUBLICATIONS

Dunham, Proc of 18$^{TH}$ Annual ESRI User Conf, XP00249159, 6 pgs., Military Base Planning Using GIS and 3D Modeling, Jul. 24, 2003.
Nakamura, Proc of Intl Conf on Image Proc, vol. 3, Nov. 13, 1994, pp. 642-646, An interactive walkthrough for a city area using the . . . .
Geographic Information Systems: A Powerful New Tool for Fire and Emergency Online, May 2000, XP002249161, 10 pgs.
GIS for Emergency Management, Online, Jul. 1999, XP002249162, 10 pgs.
Elroi, Proc of the 18$^{TH}$ Annual ESRI User Conference, XP00229160, Three-Dimensional Databases in Arcview.
Newman, URISA 98 Annual Conf Proc., XP00229163, pp. 118-122, Integrated Fire Operations with IT and GIS: City of . . . .

* cited by examiner

RISK MAPPING SYSTEM

This is a nationalization of PCT/IE03/00029 filed Feb. 27, 2003 and published in English.

The present invention relates to a risk mapping system and in particular to a risk mapping system for use by the emergency services in crisis management.

One of the major problems experienced by emergency services personnel, and in particular members of the fire services, is that there is often great difficulty in accessing emergency data such as blast radius, neighbouring sites and hazards, location of people and essential equipment such as fire hydrants, hose reels, valves and the like when arriving at the scene of an emergency. Valuable time may be lost in the search for such equipment which is unacceptable.

Another problem experienced by fire service personnel is that often they are not-aware of the dangers awaiting them inside a building. For instance, whether or not there are certain chemicals or explosives inside the building that would affect the equipment used by the fire services as well as the strategy to be adopted for fighting the blaze. An unwary fireman may be entering a potential death trap equipped with inappropriate equipment and may cause more harm than good in his efforts to control the blaze putting both his own life and those of his colleagues at risk.

The European Union has attempted to address these problems by introducing the Directives known as Seveso 1 and Seveso 2. These directives require manufacturers and other plant owners to supply local fire services with detailed drawings of their buildings, as well as outlining any dangerous substances that are kept on the premises.

This introduces its own set of problems, in that the drawings submitted are often architectural plans or "blueprints" that contain a lot of unnecessary information on the drawings. These drawings are often very difficult to interpret and many serve only to confuse matters further. The emergency personnel attending the scene still do not know the whereabouts of the hazardous materials in the building, which would affect their strategy.

Various attempts have been made to provide a risk mapping system for use in crisis management that overcomes at least some of these difficulties. These systems largely comprise databases upon which there are stored blueprints or two-dimensional site plants of specific locations that may be accessed by emergency personnel when required. In this way, the emergency personnel will have access to the drawings, if and when they are needed.

There are, however, some disadvantages associated with these risk mapping systems. First of all, each of the drawings that may be viewed is a two-dimensional drawing. Although relatively simple to generate, these drawings are in many cases insufficient for the emergency services needs. Two-dimensional drawings are, by their very nature, difficult to interpret in a quick and efficient manner. In many instances, fire service personnel will be directed through a building in which there is very low visibility due to smoke and a third person with access to the risk mapping system will be directing them via radio contact. The individual issuing directions to the fire service personnel must be able to easily interpret the drawings before them and give correct directions within a matter of moments. This is often impossible when viewing a two-dimensional sitemap or blueprint. Any delay in providing directions can have potentially disastrous consequences.

Another difficulty associated with two-dimensional risk mapping systems is that they cannot give any indication of the relative height of buildings or objects stored in those buildings. This is often of great importance, in particular to the fire service personnel who may require special equipment such as ladders, lengthier hose or additional personnel when a building is above a certain height. This information cannot be obtained from the present risk mapping systems in a quick and efficient way.

Another problem with the known types of risk mapping systems is that by having a two-dimensional plan of the building or other location, the emergency personnel will not be able to visualise the physical appearance of a structure which can delay the response time in an emergency. A two-dimensional drawing will not give any indication as to the external appearance of a structure and will thus cause emergency personnel to have to obtain more discrete identifiers of the particular locations. Often, when an emergency distress call is made from an industrial estate or refinery or the like, the response time can be significantly reduced if the emergency personnel could identify the location of the emergency in a quicker manner.

One other problem that has been experienced by the emergency services personnel with the existing risk mapping systems is that before entering the location of the emergency, it was difficult to quickly orientate themselves once they had entered the building. This was mainly due to the fact that the objects on a 2-D plan were not familiar to them once they had entered the building.

One further problem with the two-dimensional site plans and blueprints is that these drawings are often cluttered with writing and unnecessary information that is not needed by the emergency services and only cluttered up the drawing and further inhibit the ability of emergency services personnel to interpret the drawings simply and quickly. Very often, symbols to indicate items within the building would change from drawing to drawing and due to the non-uniform nature of the drawings, the information provided by the drawings was difficult to decipher and could not be fully relied upon.

Furthermore, there is at present no way of quickly accessing data relating to buildings adjacent to the building in which there is an emergency. One of the lessons taught by Seveso is that it may in fact be an adjoining building that may cause the greatest risk. This too will have some bearing on how the emergency is actually handled by the attending emergency services. Therefore, it is an object of the present invention to provide a risk mapping system that will overcome at least some of the problems mentioned above.

STATEMENTS OF INVENTION

According to the invention there is provided a risk mapping system for use in crisis management comprising:
  a database having a plurality of risk maps stored thereon;
  hazard data associated with each risk map stored on the database;
  means to access the database and select a particular risk map and associated hazard data;
  means to display said selected risk map and associated hazard data;
  characterised in that a plurality of the risk maps stored in the database are three-dimensional graphical representations of specific locations and in which, for each location having a three-dimensional risk map, there are provided a plurality of three dimensional risk maps from different aspects of that location.

By having such a risk mapping system emergency services dealing with a crisis will be able to display the relevant risk map and form a strategy for handling the crisis based on the risk map and its associated hazard data. Such information will enable them to be more thoroughly prepared when dealing with a crisis. By being able to display such a risk map and its associated hazard data, the emergency services will be able to survey the area in which the crisis is taking place and locate the positions of various hazard data before arriving at the site in question. By knowing the positions of the various fire hydrants, valves and the like, a crisis management strategy may be formulated in advance of their arrival.

By having three-dimensional risk maps, it will be easier for the person viewing the map to visualise the actual area in which the emergency is taking place. In this way, the directions given to the emergency personnel on site will be more accurate and easier to determine than was previously possible with the known types of risk mapping systems. If the emergency personnel in attendance have access to the three dimensional risk maps, then they will have a clear picture of the layout of the structure prior to entry into the structure and this may be used to plan advance routes to the most important areas in the location.

Furthermore, the three dimensional graphical representation will allow the maximum amount of information to be transferred to the operator of the system in the shortest time possible. The time taken to transfer this information is of the utmost importance. Valuable time will not be wasted in the interpretation of a two dimensional blueprint, as a clear and easily decipherable graphical representation of a location is provided. The three-dimensional risk maps will allow operators to become familiar with the layout of the location within a matter of seconds and valuable time will be saved during an emergency.

The physical appearance of a structure may also be ascertained quickly from the three dimensional risk map which will further reduce delay in the location of the site where the emergency is taking place. One further advantage of having the three dimensional risk maps is that the person viewing the risk map will be able to determine, at a glance, whether additional equipment, such as truck mounted ladders, will be required. The system will allow emergency personnel to become familiar with a particular area or location by running simulations of the scene in advance of having to attend an emergency situation at that location.

In another embodiment of the invention, the means to display the selected risk map and associated hazard data further comprises means to select a particular three dimensional aspect view of a specific location having a plurality of three dimensional risk maps. In this way, an operator will be able to view a particular location, for example, a building, from a number of different aspects so that any information contained in the risk maps will not be overlooked by the operator. Fire hydrants, emergency shut-off valves, and the like, that are obscured from one particular aspect view, will be clearly visible in one or more of the other aspect views. Furthermore, by having a number of different aspect views, the operator will be allowed to orient the three dimensional risk map in the same orientation that the building is being approached by the emergency service personnel which will further facilitate the operator giving directions to the emergency service personnel.

In a further embodiment of the invention, there are additionally provided two dimensional risk maps of specific locations. By further having two dimensional risk maps of specific locations, directions by an operator to emergency service personnel travelling by road may be given. Furthermore, an overall view of a location may be obtained from the two dimensional representation showing an entire site with a number of different buildings in view.

In one embodiment of the invention, for each specific location, there is provided an internal view risk map and an external view risk map. By having both internal and external view risk maps, not only may the emergency services personnel be directed through the interior of a building in a quick and efficient manner, they may also be able to ascertain valuable information relating to the building from external views such as the height of the building and the physical appearance of the structure which may contain very important information that could save considerable time.

In one embodiment of the invention, the external view risk map further comprises hazard data relating to other locations within a predetermined radius of the selected location. This is seen as particularly beneficial as any dangerous materials or hazardous contents of adjacent buildings within a predetermined radius will be indicated to the fire services personnel or other emergency personnel that will be alerted to the dangers. As previously stated, the most serious dangers may often be in adjacent buildings and not the building in which the emergency is taking place.

In another embodiment of the invention there is provided a risk mapping system, in which the hazard data associated with each risk map comprises a hazard icon superimposed on the risk map. By representing hazard data with hazard icons on the risk map the individual surveying the risk map will be able to obtain vital information with only a cursory inspection of the map. For instance, the positions of fire hydrants or the existence of dangerous substances can be ascertained in a matter of moments. Such a system will significantly speed up the time it will take to interpret a risk map. Although the term hazard icon is used throughout the specification it must be understood that these hazard icons may represent emergency symbols such as those indicating evacuation points, assembly areas and the like, fire symbols indicating hydrants, hose reels and other such fire fighting equipment and hazard symbols indicating the location of flammable substances or explosives. The term hazard icon has been used for convenience to identify any one of emergency, fire or hazard symbols. Similarly hazard data may be data relating to emergency, fire or hazard symbols.

In another embodiment still of the invention each hazard icon representing hazard data may have further accessible data associated therewith. It may be desirable to have additional data associated with the particular icon. For instance, if the hazard icon represents a volatile chemical, then it would be advantageous to have further data identifying the particular chemical and data relevant to the properties or handling requirements of that chemical.

In a further embodiment still of the invention there is provided a risk mapping system in which there are a plurality of different views of a particular location. By having a number of different views of a particular location the viewer will be able to see various objects that would otherwise normally be obscured if only one view were given. Furthermore, if a person not at the site is directing others at the site, it would facilitate giving directions if the person giving directions is able to have the same viewpoint as individuals that he is directing.

In one embodiment of the invention there is provided a default view of each location from a predetermined direction. For instance, each location may be provided with a default view showing each location from a southerly direction. This will provide the viewer with a consistent starting viewpoint.

In another embodiment still of the invention there is provided a risk mapping system in which there are a plurality of risk maps for each view of a particular location taken from different distances. Such a system will allow the viewer to scroll inwards to and outwards from a particular location. By zooming in and out the viewer can change from a distant overview of an area showing surrounding locations to a more detailed view of that location. One of the outermost views may comprise a surrounding area map showing access routes to and from a particular location. There may also be provided a perimeter zone map detailing a perimeter at a predetermined distance around a desired location. It is further envisaged that there may be provided a neighbour area map in which nearby buildings are shown. Indeed, these maps may be combined so that, for instance, a map showing a perimeter zone and all neighbouring buildings may be provided. This perimeter zone may be at a set distance, for instance, two hundred metres. Preferably these maps are all linked to the original selected risk map so that the viewer may switch from map to map in an efficient and orderly manner. The perimeter zone may indicate a blast radius, the blast radius being shown as an expanding red 'ripple effect' circle.

In another embodiment of the invention a neighbouring building having hazardous materials therein are given a hazard icon. This is seen as particularly useful as the greatest potential threat may be in a building adjoining a burning building. Such a system will make the viewer aware of any surrounding dangers.

In a particularly preferred embodiment of the Invention there is provided an internal layout map of the building with hazard icons superimposed onto the internal layout maps linked to each risk map. For buildings having more than one floor there will preferably be provided an internal layout map for each floor. These internal layout maps are seen as highly beneficial as hazard data for the inside of the building can be displayed and in particular the precise location of doorways, stairwells and fire fighting equipment is clearly shown. This will enable a person to either plan their own route in a building before entering or to direct others that may be in radio contact and already inside the building towards a stairway or the like. This will often be invaluable to enable fire fighters working in a low visibility smoke filled building to find their way around. It is envisaged that in multi-storey buildings each floor may be selected at random or sequentially.

In one embodiment of the invention, the individual accessing the risk map is diverted sequentially through a series of linked risk maps from the outermost view to the innermost view. By bringing the user from the outermost view to the innermost view in a sequential manner the user is less likely to miss essential data contained in risk maps taken from further away from the building that may not be contained in an internal layout map.

In a particularly preferred embodiment the specific location comprises a building such as a factory or warehouse. Alternatively the specific location may be a sailing vessel or other such site that may require attendance of the emergency services from time to time. In one embodiment each building or vessel on a risk map may be colour coded to indicate types of materials contained therein. By colour coded it will be understood to include pattern coded or indeed identified by a particular icon. The risk mapping system may be connected to a geographical information system (GIS). The risk mapping system may be also connected to a Global Positioning System (GPS). This would enable emergency services, such as the fire service to utilise the benefits of the risk mapping system with their existing legacy GIS systems. This would cause significant saving in time transferring similar data. Alternatively, the risk mapping system could be connected to other databases containing information relating to chemicals and the like. Indeed, this information could be stored on the database of the risk mapping system itself. The system may also provide access to other maps of 2D site plans, photographs or autocad drawings of a particular site or building as well as company logos or local landmarks that may assist in navigation.

In one embodiment of the invention there is provided contact details for the location, building or site in view. These contact details may be for a designated site safety officer or other relevant personnel. Photographs of these individuals may additionally be accessible through the system. Access thereto may be provided on the risk map itself.

In another particularly preferred embodiment of the invention, there is provided a risk mapping system in which the risk maps and the associated hazard data and the means to access and select a particular risk map and associated hazard data are stored as a computer program. The computer program may be stored on a carrier signal or a record medium such as a CD ROM, DVD, floppy disk, or the like. It is envisaged that the database may be accessed over the internet or intranet.

In another embodiment of the invention, there is provided a three dimensional risk map for use with the risk mapping system.

In one embodiment of the invention, this three dimensional risk map is stored as a computer program. The computer program may be stored on a carrier signal or a record medium such as the CD ROM, DVD, floppy disk, or the like.

In a further embodiment of the invention a risk map may be divided up into a plurality of smaller risk maps, this is seen as beneficial where a site is large and sub-division into a number of smaller areas will allow better detail of the overall area to be shown. These may be referenced using a grid reference system.

In another embodiment of the invention the means to display the risk map is a personal computer. Alternatively the means to display the risk map comprises a laptop or a hand held palm pilot (Trademark) or similar device. By having a laptop or hand held device the person viewing the risk map may be at the scene of the crises viewing the risk map on the portable device.

In a further embodiment of the invention there is provided a method of generating a risk mapping system comprising the steps:

converting the architectural plans of a specific location into computer readable format;

forming a 3-D schematic representation of the specific location;

collecting hazard data for the specific location;

generating hazard icons for each piece of hazard data and further generating hazard control information associated with each hazard icon;

superimposing the hazard icons generated from the hazard data of the specific location onto the 3-D schematic representation of the specific location;

storing said schematic representation with hazard icon superimposed thereon in a database.

Such a method is seen as particularly efficient and cost-effective for generating a risk mapping system. Of course, it is understood that the hazard data collected for the specific location includes collecting and collating hazard, fire and emergency data for the specific location and surrounding site. The specific location could be a building, ship or other structure.

In another embodiment of the invention, the method further comprises the steps of storing any further generated hazard control information in the database. This further generated hazard control information could comprise the contact details of responsible persons in the particular building or structure or further information relating to the types of chemicals and the treatment methods for those chemicals.

In a further embodiment of the invention, the step of forming a three dimensional schematic representation of the specific location further comprises generating at least one internal view risk map and at least one external view risk map. This is seen as particularly beneficial as this will provide a more complete system for the emergency services that will enable them to obtain a complete visual image of the building or other structure prior to being on location.

In one embodiment of the invention, an internal view risk map is generated for each level in the specific location. This will provide a complete risk mapping system that will provide emergency services personnel with all the information necessary to handle the particular emergency.

In another embodiment of the invention, the method further comprises forming a plurality of 3-D schematic representations of the specific location from a plurality of different aspect views of the location. Again, this will provide sufficient information relating to a specific location to the emergency services so that an emergency may be handled in a simple, quick and efficient manner. The emergency service personnel will be able to access all of the data relating to a particular location.

In a further embodiment of the invention, the method further comprises the step of gathering contact details for individuals responsible for safety of a specific location and storing the contact details of that individual in the database. By having the contact details always at hand, coordination of an emergency is greatly facilitated.

In another embodiment of the invention the method includes the step of programming links from the system to associated external databases such as a Geographical Information System.

In another embodiment of the invention the method provides means to update hazard icons and provide new hazard icons with associated data therewith.

DETAILED DESCRIPTION OF THE INVENTION

The invention will now be more clearly understood from the following description of some embodiments thereof given by way of example only with reference to the accompanying drawings in which.

Figure 1:
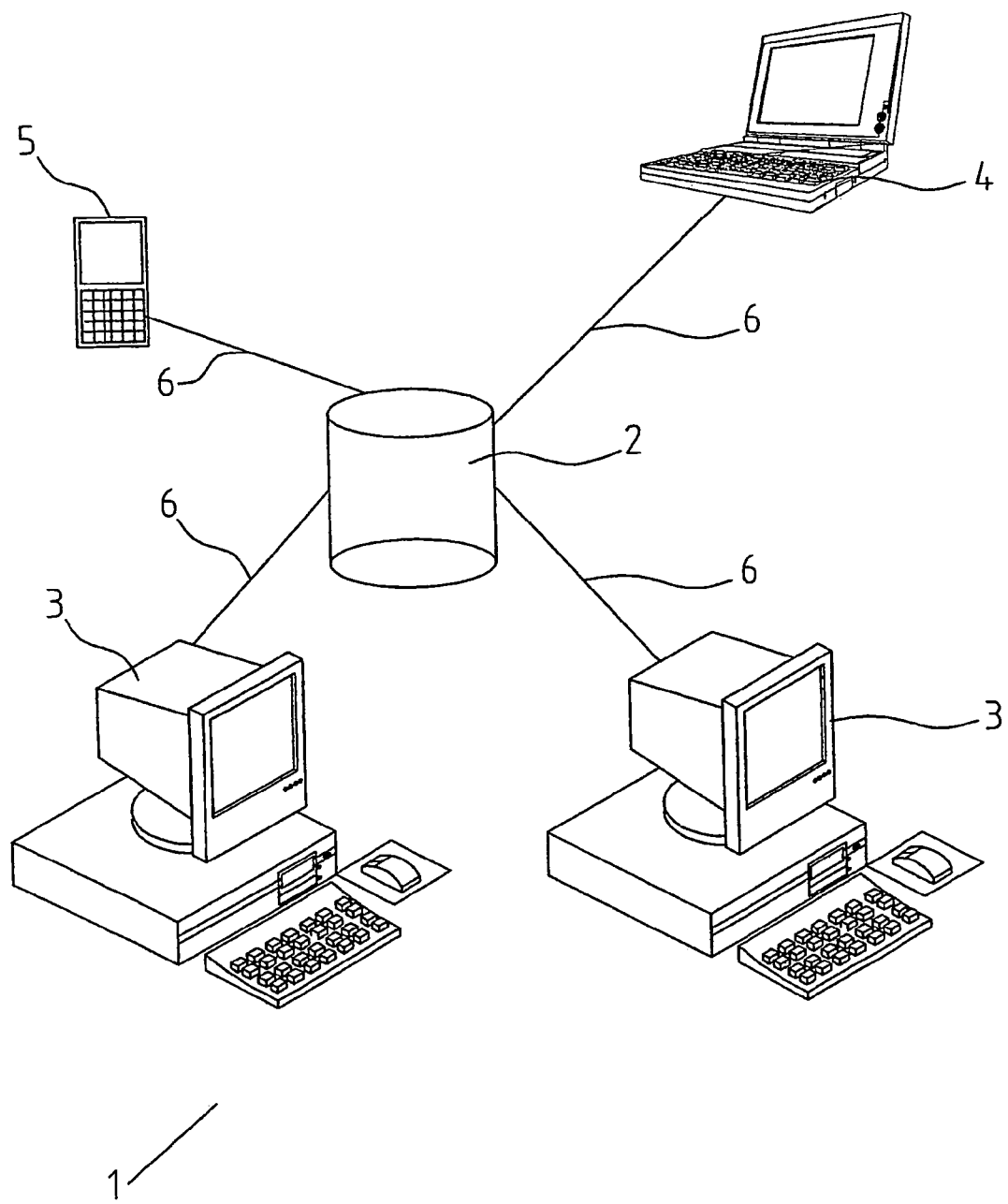
FIG. 1 is a diagrammatic view of a network incorporating the system.
Figure 2:
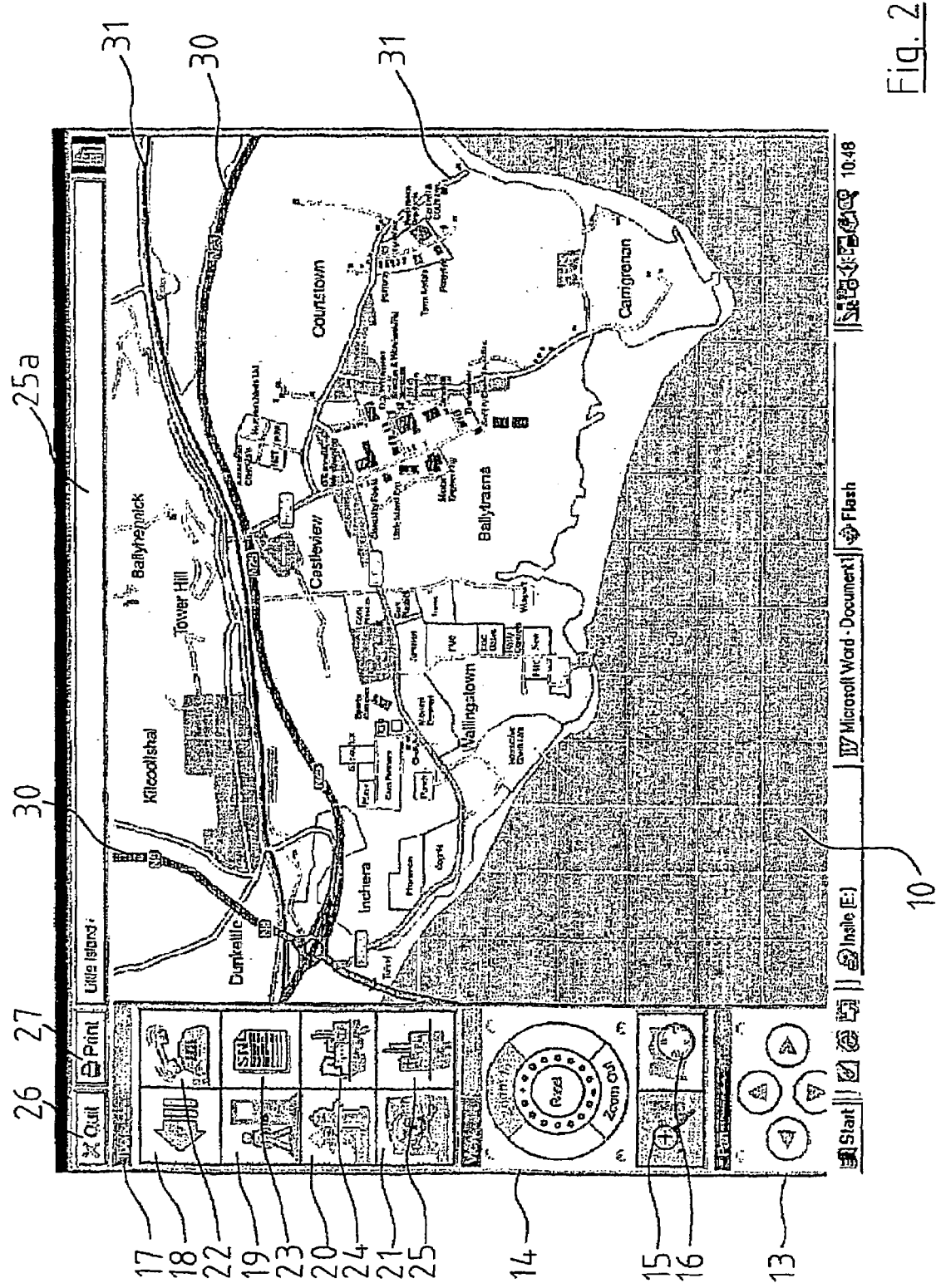
FIG. 2 is a screen shot showing a local area risk map.
Figure 3:
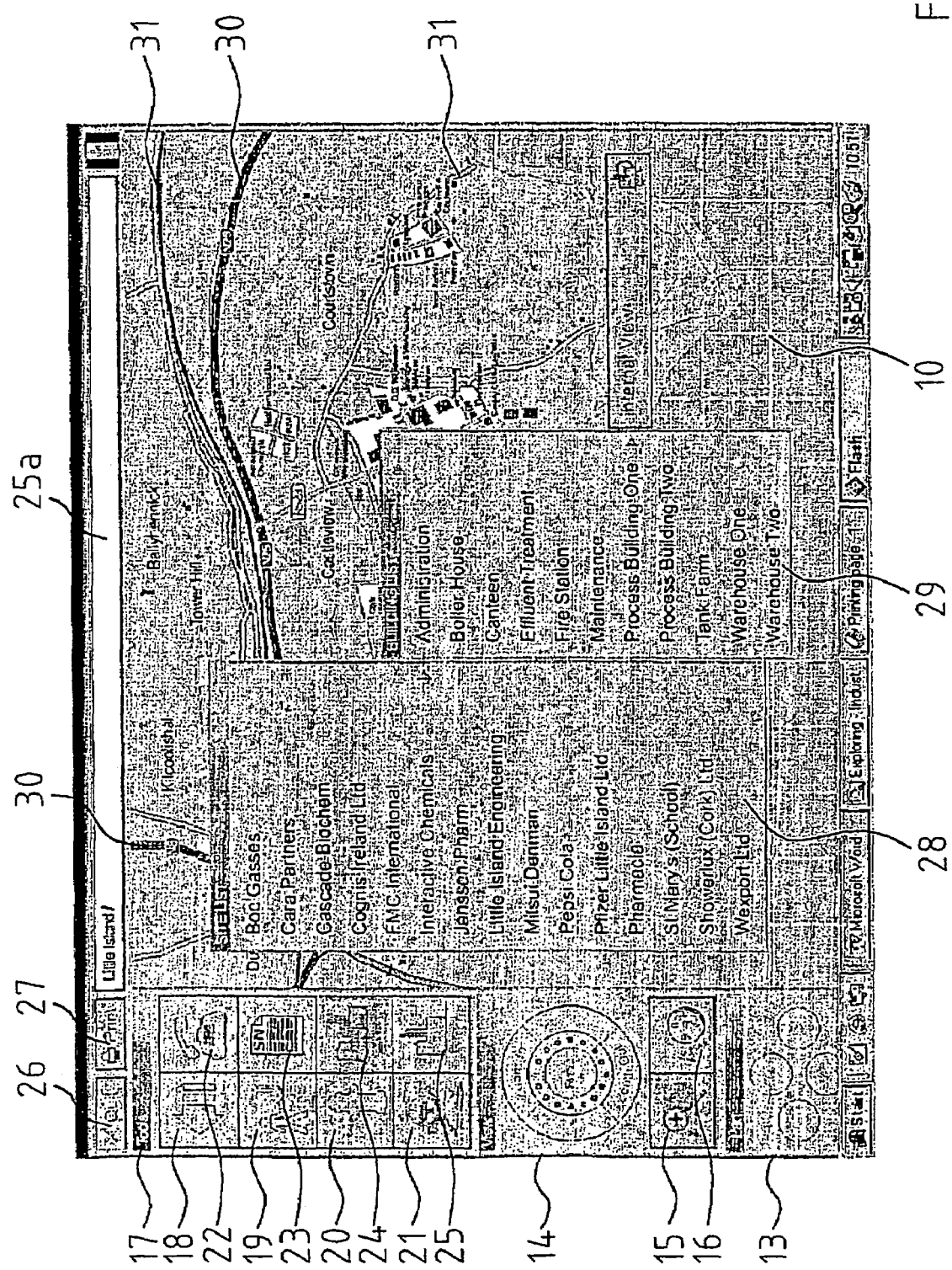
FIG. 3 is the screen shot shown in FIG. 2 with display lists shown.
Figure 4:
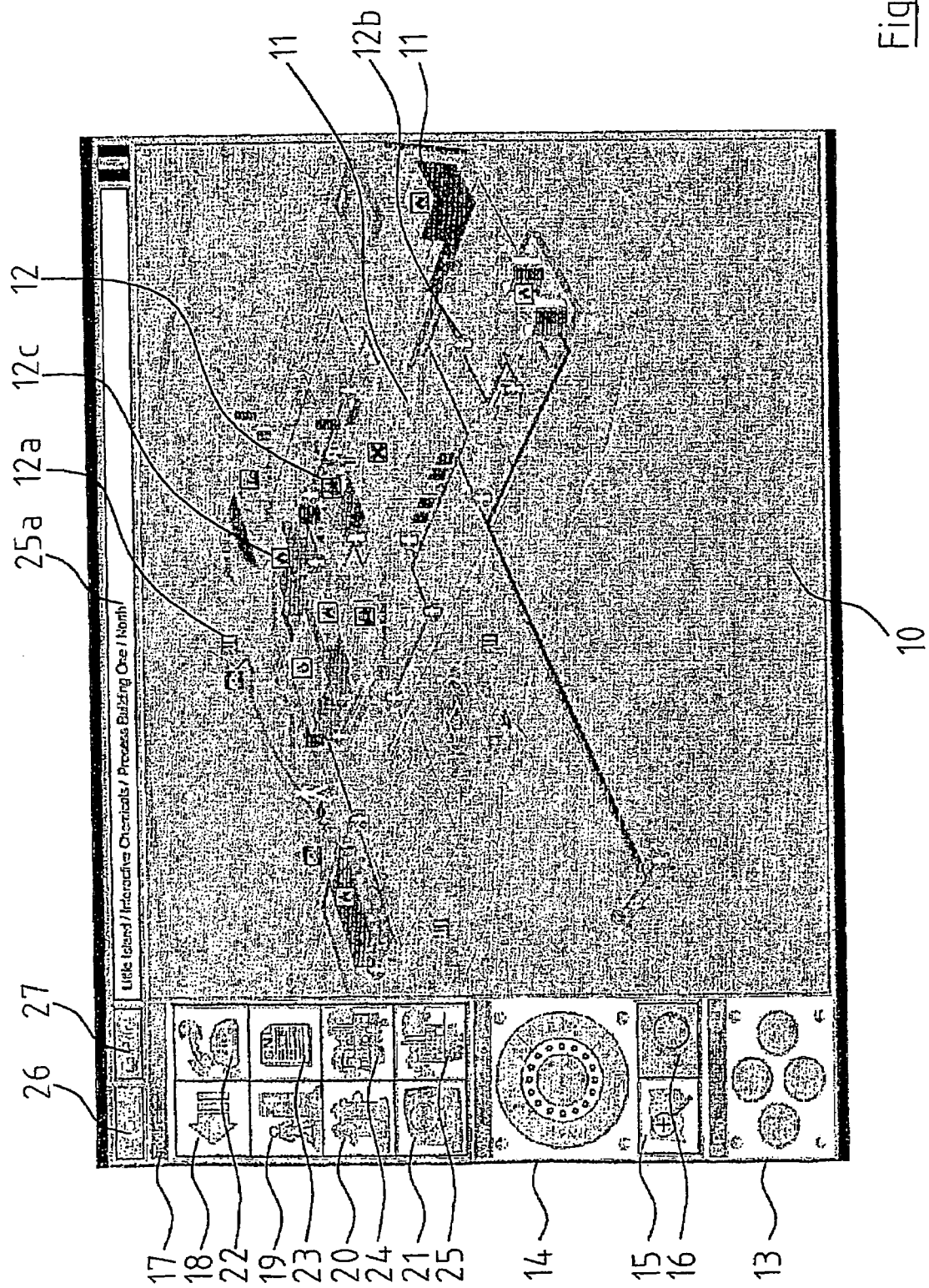
FIG. 4 is a screen shot of a site risk map.
Figure 5:
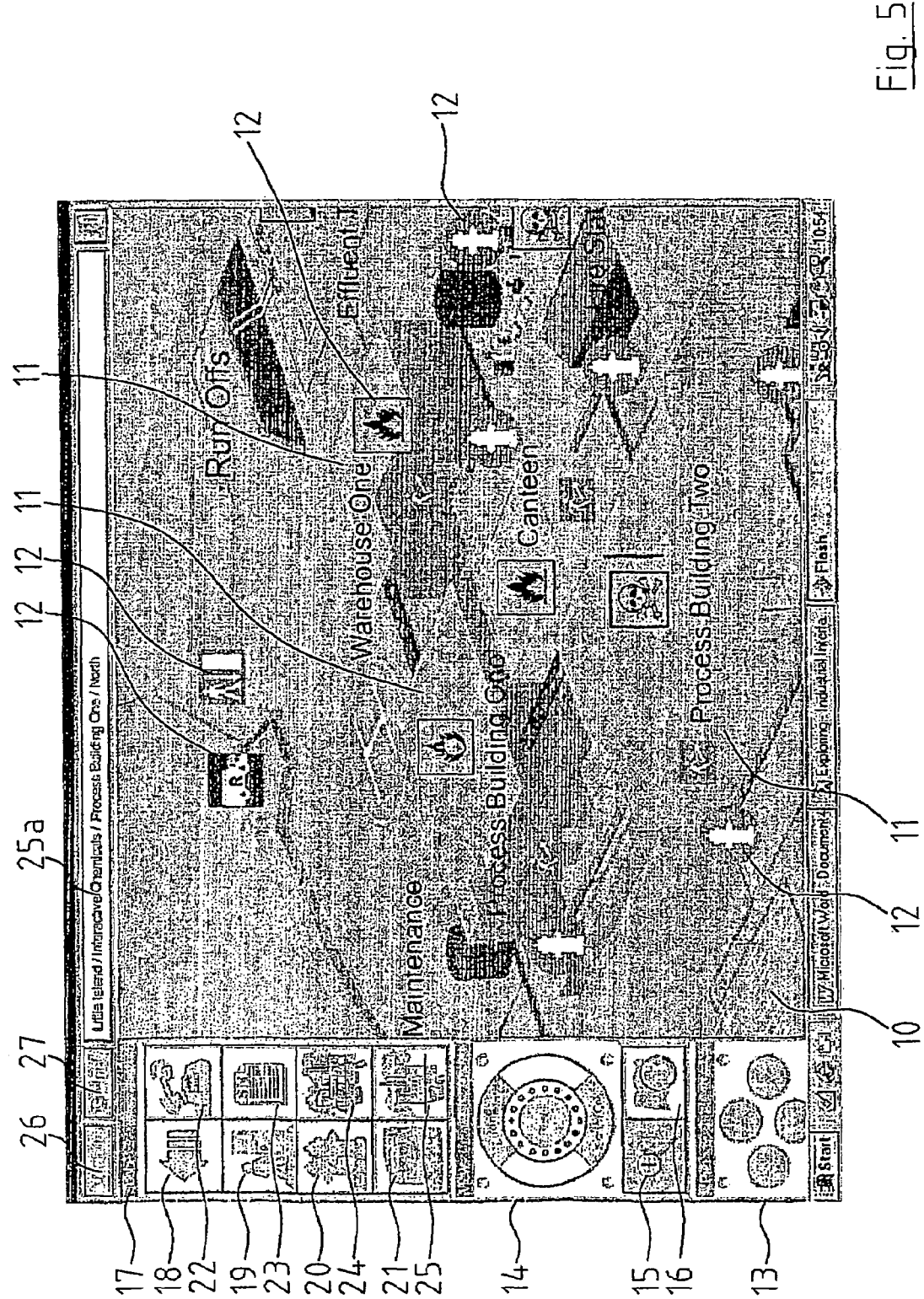
FIG. 5 is a screen shot of a building risk map and surrounds within a 3D site risk map.

Referring now to the drawings and initially to FIG. 1 thereof there is shown a risk mapping system for use in crisis management indicated generally by the reference numeral 1, comprising a database 2 having a plurality of risk maps and hazard data associated with each risk map stored thereon. The system further comprises means to access the database and select a particular risk map and associated hazard data as well as means to display the selected risk map and data, these are provided individually by personal computers (PC) 3, laptops 4 and hand held devices 5. PC 3, laptop 4 and hand held device 5 are all connected to database 2 by communication channels 6. Referring now to FIGS. 2 to 9 inclusive, there are shown various screen shots showing two dimensional and three dimensional risk maps, starting with a local area risk map of Little Island Industrial Estate in County Cork, Ireland with several different sites shown thereon (FIGS. 2 & 3) progressing through closer, more detailed views of a particular site from the local area risk map, in this case Interactive Chemicals site (FIGS. 4 & 5). Finally, three dimensional risk maps of a particular building from the chosen site, in this case Process Building One, including internal view risk maps of the building (FIGS. 6-9 inclusive) are shown. For reasons of clarity and understanding it is felt best to begin by describing the risk map shown in FIG. 4 of the drawings.

In FIG. 4 of the drawings there is shown a three dimensional risk map 10, and in particular a site risk map, showing a typical layout of a chemical plant incorporating several buildings 11. Hazard data is indicated in the form of hazard icons 12. Further hazard icons are indicated by the numerals 12a, 12b and 12c. The hazard icons may represent the location of fire hydrants, emergency exits, dangerous chemicals, toxic substances and the like. Hazard icons 12a, 12b and 12c are an emergency symbol indicating the location of an assembly area, a fire symbol indicating the location of a fire hydrant and a hazard symbol denoting the position of flammable material respectively. Various functions are available to the user of the risk map to allow him to manipulate the view of the risk map shown. A pan panel 13 allows the user to manipulate the map up or down and from side to side in the screen area by clicking on the arrows in the pan panel in the known manner should the operator wish to view parts of the map currently out of shot.

A view panel 14 is provided that may be operated in either zoom mode or aspect mode. When in zoom mode the user may zoom in and out of the image depending on the level of data required and in rotate mode the user is given the option of viewing the risk map in a northerly, southerly, easterly or westerly facing direction. The view panel 14 may be toggled between either zoom mode or rotate mode by clicking on the zoom button 15 or the rotate button 16, depending on which mode the user wishes to use.

A tool panel 17 further allows the user to manipulate the data shown on the risk map as well as accessing relevant data from legacy Geographical Information Systems (GIS) or other relevant data from database 2. Back button 18 will allow the user to return to the previous screen viewed. Emergency button 19, fire button 20 and hazard button 21 allow the user to toggle these icons that may be appearing on a risk map on or off, bringing the relevant icons in and out of view in the process. This may be particularly advantageous as the risk map may be cleared of any unnecessary information to prevent clutter and confusion.

Access to existing GIS and other data may be obtained by operating contact details button 22 and special note button 23. Contact details button 22 will cause the relevant details of security personnel for the site or other relevant individual to be retrieved from memory and displayed on the screen. Special note button 23 may be used by the operator to display information relevant to a hazard icon on the risk map or the site itself including the toxic chemicals stored there, how to treat those toxic chemicals, the prevailing weather conditions, the fire plan of the plant and the like that may be necessary in any crisis situation.

Site list button 24 and building list button 25 are also connected to a GIS. Operation of the site list button will cause all sites in the particular locality to be displayed allowing the user to select a particular site of interest. If a site has already been selected then a building list may be displayed by depressing the building list button 25. From this a particular building on a site may be selected. The current map being observed is shown in Route-list button 25*a*. Finally, quit and print buttons 26 and 27 respectively are provided, their use being self-explanatory.

Referring now once again to FIGS. 2-9 inclusive of the drawings, like parts are given the same reference numerals. In use, the operator will activate the system which may offer access to a number of different local area maps. The operator selects one such local area map from a selection in a pull down menu, in this case Little Island Industrial Estate in County Cork, Ireland. The two dimensional local area risk map, as shown in FIG. 2, is displayed along with all major access roads 30 and secondary roads 31 in the area. This is often very important as directions may be being sent to the drivers of emergency vehicles en route to the scene of the emergency by call centre personnel who may or may not have knowledge of the area. Once a local area map is displayed the user depresses the site list button 24, which causes a list of the registered sites in that area to be displayed. A site list 28 of registered sites is shown in FIG. 3. The user may click on one of the sites, which is identified on the map by a flashing red dot. An expanding red 'ripple effect' circle (not shown) further highlights the selected site and denotes the blast radius. The user may then decide to click on the highlighted site for a view of the actual three dimensional site risk map, as shown in FIG. 4. Alternatively, if the user is familiar with the whereabouts on the local area risk map of the site in question, he may click directly on that site in the known manner. This will select the site and a further click on the site will bring up the site risk map as shown in FIG. 4. If the user wishes to do so, he may access the building list 29 directly from the site list 28 shown in FIG. 3. By selecting a building from the building list 29 by clicking on that building the user will be taken immediately to a view of that building. Further options, such as internal views of buildings, may also be offered.

Once the user has selected a site, the entire site is shown from a default aspect, in this case a north facing aspect. If the operator so wishes he may view this site from a different aspect by toggling the view panel 14 to rotate mode by clicking on rotate button 16 and thereafter clicking on one of the aspect options in the view panel. By looking at the various aspects the user may view objects that may be obscured from view in other aspects.

The user may now select a building from the site chosen. This can be done by clicking on one of the actual buildings itself or by clicking the building list button 25. By clicking on the building list button 25 a list of all the buildings on the site is shown to the user and he may select one from the list by clicking on that building name. This will advance the user to the next screen, namely a three dimensional building risk map showing the selected buildings and the nearby buildings. The three dimensional building risk map is shown in FIG. 5 of the drawings. In this case the user has requested Process Building One. This building along with nearby buildings and hazard icons is brought on screen. From this the user may determine whether the hazards other than those to be encountered in the selected building are present in the surrounding buildings as this may affect the approach taken by the fire personnel. If the user requires further information on the hazards identified by a hazard icon 12, he may click on the hazard icon itself or alternatively he may click on the special note button 23. These will give further information on the hazards shown.

Figure 6:
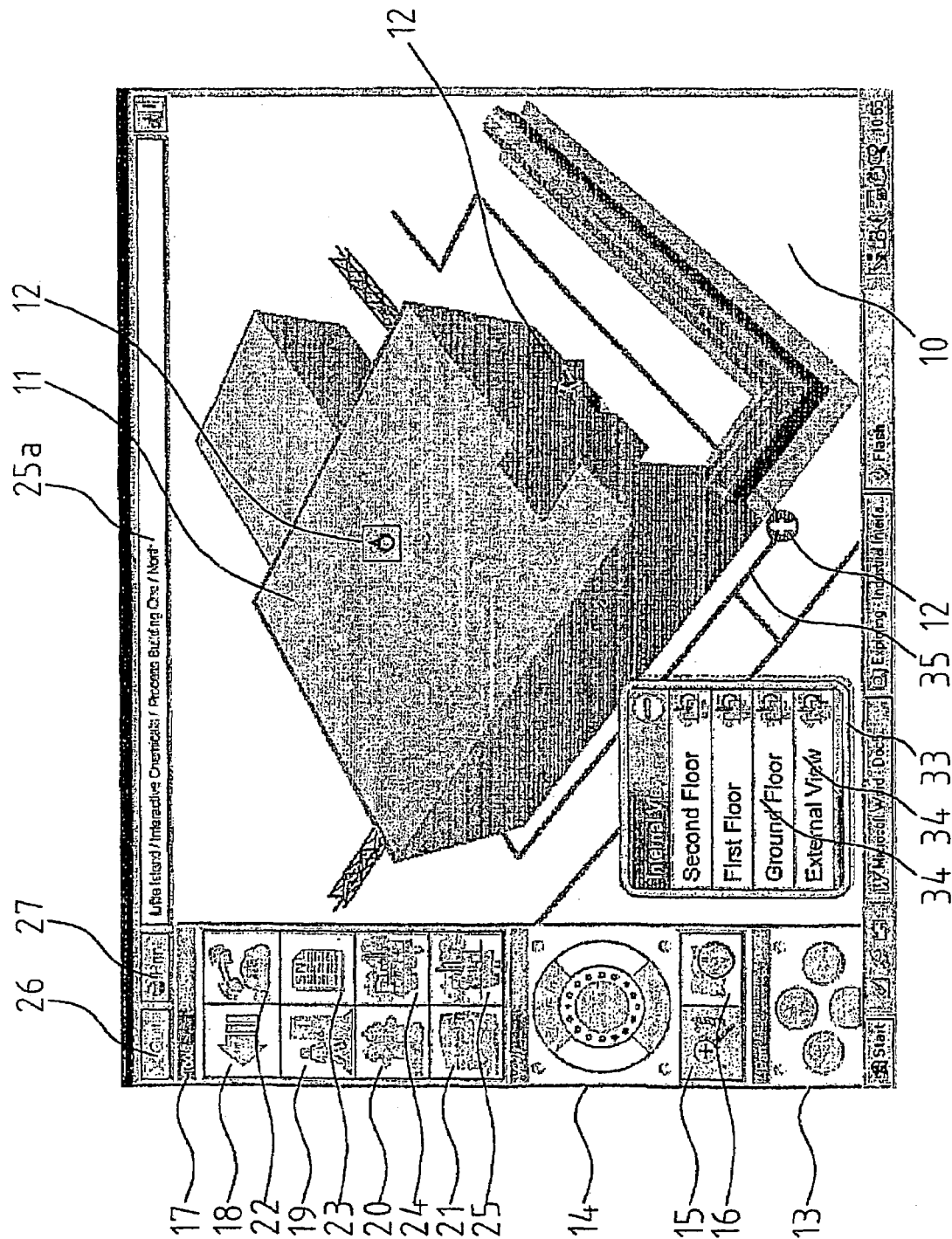
FIG. 6 is a screen shot of a building risk map with surrounding buildings removed from view.
Figure 7:
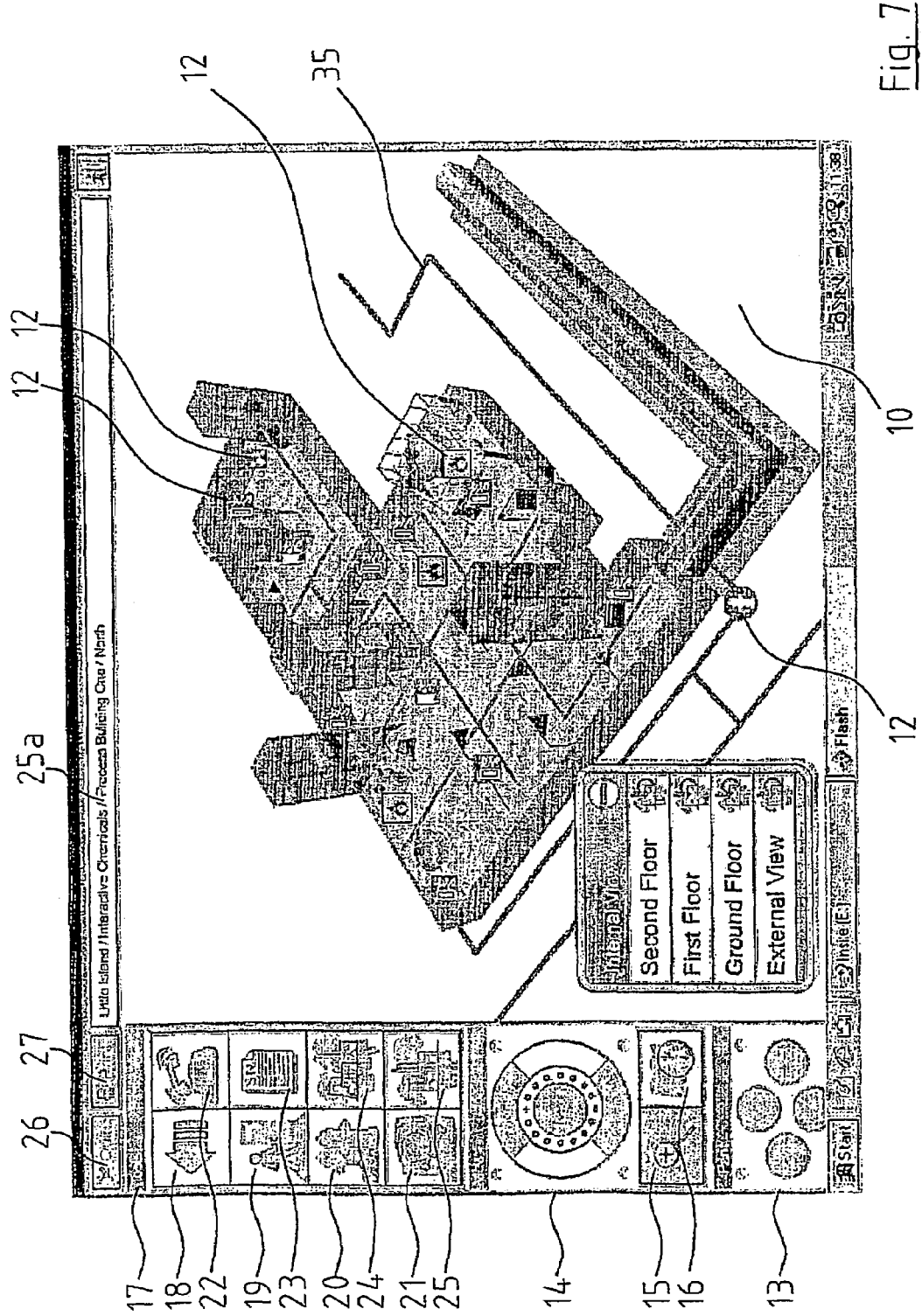
FIG. 7 is a screen shot showing the ground floor of the building shown in FIG. 6.
Figure 8:
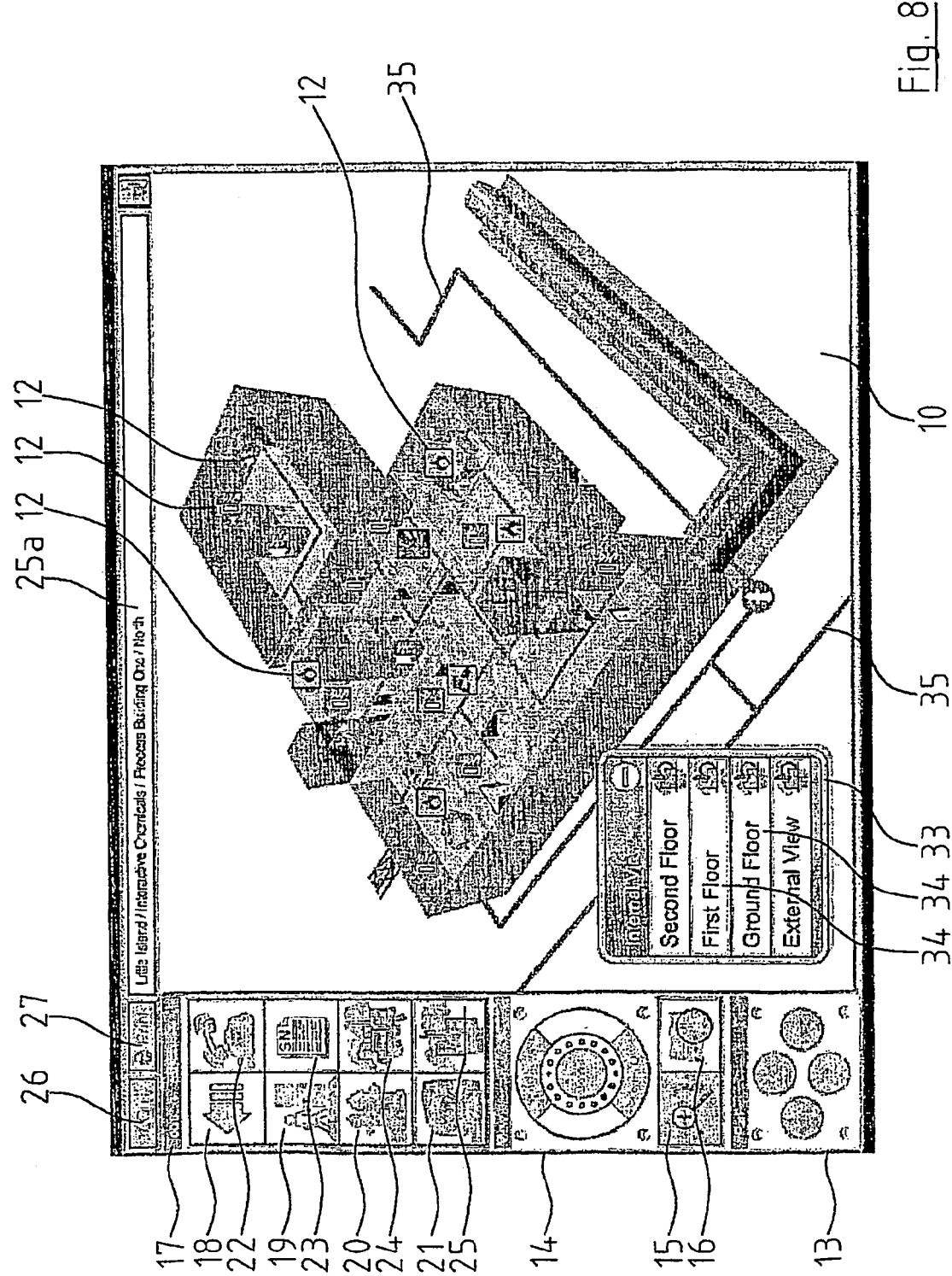
FIG. 8 is a screen shot showing the first floor of the building shown in FIG. 6.
Figure 9:
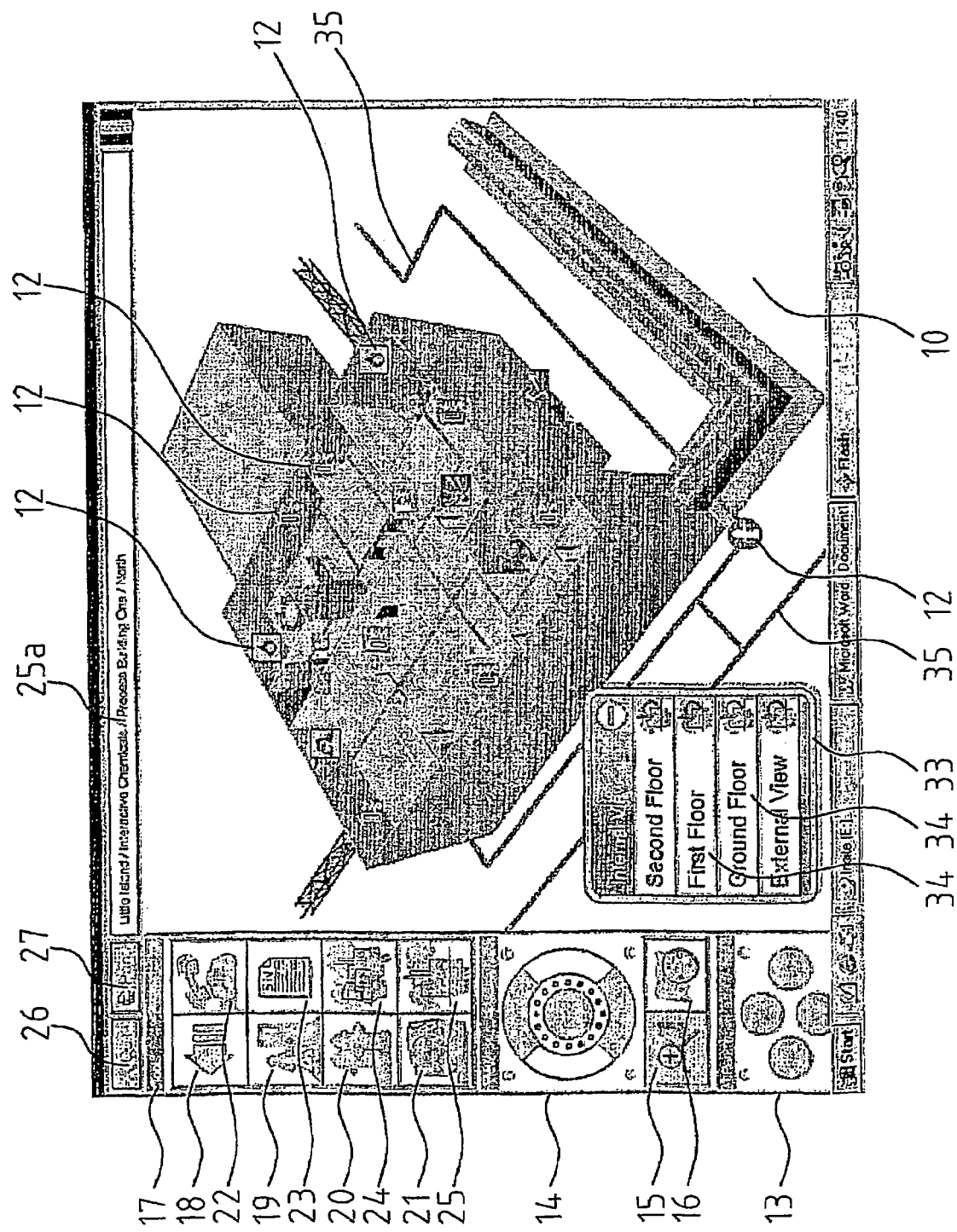
FIG. 9 is a screen shot showing the second floor of the building shown in FIG. 6.

From the building hazard map the user may click on any of the buildings to have a view of that building shown in isolation from the other surrounding buildings. One such view is shown in FIG. 6 of the drawings. From this view various internal views of the building may be called from internal view panel 33. By clicking on an appropriate floor button 34, the user may access an internal risk map view of that floor as demonstrated in FIGS. 7-9 inclusive.

It can be seen from the drawings that other data such as water pipes 35 and the like can be enlarged and shown at ground level which may be of benefit in fighting a blaze in a crisis situation. Again, as was the case before, the hazard icons, emergency exit icons and the water hydrant icons may be toggled on or off to avoid confusing the viewer with clutter and to ensure that only the information requested by the viewer is displayed at any one time.

It has been found that in some instances obscured objects may be partially revealed by cutting away a portion of a wall, for instance, or by giving the icon a different colour than its normal colour to indicate that it is being viewed through a wall. This is particularly advantageous as important information is always visible.

Of course it will be understood that the communications channel may be a dedicated cable, fixed line telephony link, mobile telephony link or radio communication link and the like and it is not restricted to a permanent link. The system could be accessed by a password protected site on the internet. Indeed, the system may be on an intranet of a company for use in fire safety awareness among their personnel or on the fire department's databases in the regional headquarters.

It is seen as particularly efficient to have a mobile communications link to the device as a fire service officer may have access to the risk maps when he is on site. It is normal fire service procedure to send a district officer to administer all the fire personnel when there has been more than one fire truck sent to any incident. By allowing a district officer access to the risk maps he may direct operations based on the information given to him in a much more efficient manner. This would allow him to direct fire service personnel under his charge before they go into a building, or indeed if he is in radio contact with fire service personnel inside a building he may be able to direct them once there are inside where visibility due to smoke may be low. Of course this could also be achieved directly from headquarters if they were in radio contact with the person on the scene. Alternatively, the system or part thereof may be located in each fire truck.

It is envisaged that the risk maps of a particular area or site may be stored on disk and only accessed when necessary. For instance, a district officer may have a number of disks for his area of responsibility and he may choose only to use one disk at a time, depending on where the emergency is taking place. This may save on the actual storage requirements of the individual device that he is carrying. Indeed, instead of a disk the risk maps could be stored in computer readable format on a CD-Rom, DVD or any such device. It is envisaged that the computer readable format could also be stored on a carrier signal. This carrier signal may be any transmissible carrier such as an electrical, optical or radio signal, which may be conveyed by an electrical or optical cable or other means. Indeed, the carrier may be constituted by such means. Due to the very nature of the invention it will be understood that various parts of the system may be located remote from other parts of the system. By remote it is meant that not only could the parts be physically separate but individual parts may be located in other jurisdictions. For example the database having a plurality of risk maps thereon may be stored remote from the means to select and means to display the selected risk map and vice versa. The database could in fact be located in one jurisdiction and accessed by the means to select a particular risk map in another jurisdiction. In this way the database could be accessed over the internet or a private network.

The system may also be adapted to display 3D Risk Maps of various aircraft, rail coaches, locomotives and other vehicles. New control buttons may be added to the system application to provide access to specialised data found in aircraft, ships or other vehicles. Emergency data such as the location of batteries, isolators, fuel valves, fire suppression systems such as Halogen Sprayers may be shown.

The application can be modified to allow emergency services personnel to access operational manuals, Standard Operating Procedure (SOP), and Good Management Procedure (GMP) documentation. Diagrams, schematics and other instructions could be made available through the system giving information on for example how to operate the fire control panel, turn off machinery, open secured areas such as airlocks, watertight bulkhead doors and the like. The system can also be used to call up emergency services training manuals and other related documentation. For example, data, on the correct equipment and attire for fighting an ammonia leak may be obtained on request.

The system application can also contain an audio facility. This function would allow emergency services personnel to hear samples of alarms, claxons and other audio signals and messages that may be broadcast on a site. Each audio sample would be accompanied by a description, for example, an ascending pulse tone=Evacuation. The audio instructions could also comprise pre-recorded audio instructions for that specific site.

It is envisaged that further advantages and uses may arise from the implementation of the risk mapping system described. For instance, the system could be used by the emergency services for crowd management in and around stadiums, concerts and town centres and the like. The system could be used in the simulation of disaster scenarios, allowing the emergency services to visualise emergency situations, to familiarise themselves with the layout of major sites and to prepare contingency plans. The system could furthermore be put to use by the corporate industrial sector. It is envisaged that access to particular companies 3D risk maps may be made available via the internet or an intranet to assist in staff training and further planning and development decisions for a site. Graphics of internal processes and procedures of a site could be incorporated into the 3D risk map to allow management to visualise activities in the site and to plan accordingly.

It is envisaged that various further features could be added to the risk mapping system to enhance the usefulness of the system. One such feature would be a blackout icon. The blackout icon appears automatically on the risk map wherever there are areas that are subject to communications blackouts such as deep valleys, tunnels & other areas with poor reception. Clicking on the Blackout icon superimposes a semi transparent layer over the maps, plans or three dimensional risk maps indicating the affected areas. An additional text box also appears under the Blackout icon providing the user with additional information such as which methods of communications are affected, namely, radio, mobile phone or other such methods of communication.

Another additional feature is the electrical prohibition icon. The electrical prohibition icon appears automatically on screen wherever there are areas on site where electronic devices liable to cause ignition are prohibited. When clicked, the Electrical Prohibition tool superimposes a semi transparent layer over the plans, maps or three dimensional-risk maps indicating the affected areas. An additional text box appears under the Electrical Prohibition icon providing the user with additional information such as which type of electronic devices are prohibited.

Another still feature of the invention is the dangerous noise level icon. The dangerous noise level icon appears automatically on screen wherever there are areas that are subject to loud noise that may damage hearing and/or make audio communications difficult. By clicking on the Dangerous Noise Level icon a semi transparent layer is superimposed over the maps, plans or three dimensional risk maps indicating the affected areas. An additional text box also appears under the Dangerous Noise Level icon providing the user with additional information such as decibel levels or ear protection requirements. As loud noise may disrupt audio communications the Blackout icon may also appear in dangerous noise level areas.

One feature of particular benefit is the recorder feature. The recorder is activated automatically once the user accesses the risk mapping system by entering a valid password. The Recorder saves a digital record of the date, start time, operational duration and which functions the user accessed while the system was in use, into a password encrypted folder on the PC hard drive. This digital recording can be accessed by an authorised person and used in evidence in subsequent legal actions, coroners court cases, insurance claims, internal and public enquiries and as a valuable source of real-time information for post incident analysis, response analysis and pre-fire planning & training. The Recorder is deactivated once the system is switched off.

The system may also have a stopwatch feature which is activated automatically once the user accesses the system by entering a valid password. The stopwatch function keeps a record of the date & time during which the systems application is active. This information, saved by the system Recorder will allow post-incident analysts to measure emergency services response times and the amount of time the system user accessed elements of the risk mapping application. The stopwatch is deactivated once the system is switched off.

A language tool may be provided to allow the user to select the language the system is to be displayed in. The selected language is shown on the top toolbar as the national flag or the written name of the chosen language. By clicking on the language icon a pull down menu of the available alternative languages appears. By selecting an available language from this pull down menu the user can then change the language displayed by the system.

A scale measurement in meters may be shown on all maps, plans & three dimensional risk maps displayed on the maps viewed by an operator. Some three dimensional risk maps shown in perspective are unsuited to the display of absolute measures in which case an area on the three dimensional risk map is selected, for example a road, usually in the immediate foreground, and an example horizontal distance is displayed. Similarly, a prominent building on the three dimensional risk map may be selected and a sample vertical height measurement is displayed on or beside it. Scale measurements may also be shown on or beside individual buildings or specific areas.

One particularly useful feature is the range tool. This allows the user to touch the touch-screen at any point on the three dimensional risk map and drag a finger or stylus across the screen. The user may also be required to hold down a range button while dragging their finger or stylus across the screen. The application draws a line from the initial contact point to the point where the user breaks contact with the touch-screen. Once contact is broken the range line remains displayed on screen and a text box appears in the middle of the range line displaying the line length in meters. Clicking on the range icon in the Control Panel clears the range line & text from the screen. The range tool is designed to allow the user to measure distances on plans, maps or three dimensional risk maps, for example the user can determine the distance from a hydrant to a selected building thus helping the user to select appropriate hose lengths, spray ranges and safe personnel/ equipment locations.

Another available feature of the invention is the camera tool. The camera tool provides the user with access to a range of photographic or film images of the site. After selecting the Camera tool from the Control Panel, the user is provided with a pull down menu of available camera types including Still, Movie, CCTV, Satellite, Aerial & Vehicle Mounted. By clicking on these camera Icons the system displays the selected Camera icons in the correct position wherever they occur on maps, plans or 3D risk maps. Each camera icon has a directional arrow, in the case of still images; or a directional scope, in the case of film or movies, that indicates the direction that the associated photograph or film was taken from. Clicking on a Camera icon opens the associated photograph or film in an on-screen window. Information such as the name of the buildings in the photo, the date it was taken and the compass direction it was taken from appears on the image. A Camera icon with a Red Dot in the top left hand corner indicates Infra Red capacity.

The camera tool provides additional visual information to the system User, helping to locate and identify buildings, tanks and the like, and assisting emergency services to orientate themselves on site. Using the Camera tool the system user can locate personnel from their descriptions of prominent objects or buildings or inversely, direct personnel by directing them in reference to such photographed objects or buildings.

The camera blind-spot tool is an additional utility that can be accessed from any Camera icon displaying the 'Blindspot' tab. By selecting the 'Blind-spqt' tool the system user superimposes a Field of Vision Cone (FVC) onto the plan, map or three dimensional Site risk map, expanding from the location of the selected Camera showing the scope, angle and range of that camera. The FVC can be made up of radiating segments of different colour that indicate the decreasing image quality of the camera view as the range increases. Where a camera has multiple vision formats such as infrared, ultra violet and the like, the FVC can be altered to show the range, angle and scope & blind spots of each vision format. The blind-spot tool highlights areas within this FVC that cannot be seen by the camera by displaying blindspot areas with a different colour or pattern. The 'Blind-spot' tool is designed to make the Camera user aware of the limitations of CCTV and other Camera hardware and is of particular use to the Security services in, for example search or assault operations where a fugitive may be hiding in CCTV blindspots.

One particularly useful feature is the tracker tool. The TRACKER tool is a search engine and tracking system that allows the user to identify and locate personnel, vehicles and specific items of equipment that may be available at an emergency scene in real time. Personnel, Vehicles and items of Equipment fitted with a 'tag', such as a GPS transponder or radio tags, can be tracked by GPS, GIS, Radio Triangulation or similar tracking systems. This 'tag' Information can be relayed to the system via satellite, phone; WAP, microwave, radio or other broadcasting system. As the system receives 'tag' information the Tracker tool automatically appears flashing on screen. By clicking on the Tracker tool, the system displays a pull down menu of the Tracked persons, vehicles or items detected. The user selects the required target, for example, Fire Engine 5 and the appropriate icon representing that vehicle is super-imposed on the map, plan or 3D risk map in position according to the geographical information received from the GPS, Radio Triangulation or other tracking systems.

The user can click on any of these Tracker icons to access the Contact database which provides access to a range of Information Cards containing data about the tagged person, vehicle or item of equipment that has been pre-programmed into the system and stored on the system. The contact database includes Information Cards such as Personnel Information Cards containing data such as Profession, Name, Rank, Contact Details, Photograph, Blood Type, and the like. Vehicle Information Cards contain data such as Vehicle Type, Base of Operations, Contact Details (radio call signs etc.) Crew Compliment, Water Carrying Capacity, Vehicle Range & On Board Equipment lists. Each Vehicle Information Card has an interactive three dimensional Model or photograph of the vehicle. The interactive three dimensional Vehicle Model/ Photo tool allows the user to click on lockers and storage areas pulling down lists of the equipment stored therein. The user can click on individual items of equipment from these lists to access Equipment Information Cards.

Equipment Information Cards containing photographs or three dimensional Equipment Models and data such as ladder length, snorkel range, generator output, breathing gear, number & capacity of pumps and the like can be accessed either from the Equipment button and subsequent pull-down menus or via the three dimensional Vehicle Model/Photograph from the Vehicle Information Card.

Where the tagged Person, Vehicle or item of Equipment has the capacity to collate & send data, the system has means to receive this data and display it on the appropriate Identity Card with a 'LIVE FEED' icon. For example, the on-board vehicle computer on Fire Engine 5 senses that Pump 3 is working at 65% capacity & that it's on-board Fire Water Supply is at 34%. This information is broadcast by radio or other such method and received by the system. The system user activates the Tracker tool from the control panel and selects Fire Engine 5 by clicking on the appropriate on-screen Icon. This opens the Vehicle Identity Card for Fire Engine 5 that displays the relayed sensor information in the 'LIVE DATA' Panel.

If a vehicle is equipped with on-board cameras, the visual information from those cameras can be broadcast from the vehicle via GIS, GPS, Radio or other such way. The system has means to receive this information and identify the source. A 'Camera' icon appears on the three dimensional Vehicle Model/Photograph on the Vehicle Identity Card. The system user can click on that Camera icon to open an on-screen window displaying the view from that on-board camera.

Another available feature of the system is the contact tool. The contact tool provides access to a database containing a range of information such as on site Security, Medical and Emergency Response Teams or Emergency Services Vehicles, Personnel and Equipment.

By selecting the required category a 'family tree' hierarchical structure showing the names and position of each relevant person on site such as an Emergency Response Team (ERT) member on the premises appears. The User can click on each of these nametags to open the Identity Card page. The Identity Card includes the name, ERT role, age, contact address on-site and numbers including phone, mobile, pager, email, and the like, a photo of the staff member, key holder status, disabilities, years at site, qualifications, key experience & Security Clearance Level, blood type & languages. The designated emergency assembly location for each ERT member is shown either as text or by showing the appropriate location reference number on the ID card. The system user can click on the designated location icon to highlight that location on the three dimensional Site risk map. Each I.D Card has a print button. The 'Contacted' and 'ON SITE' check boxes can be clicked on screen, helping the user to avoid unnecessary repeat contact attempts. If the computer running the system has phone, internet or other communications systems the user can click on elements such as email or mobile phone, from the Identity Card, automatically accessing the communications hardware on the computer to contact the person in question.

Another feature of the system is the ability of the system to receive signals from alarm or other sensor systems within a site, building or ship such as smoke alarms, heat sensors, intruder alarms or CCTV cameras displaying them as icons on screen. Each of these sensors is given an individual identification code that is programmed into the three dimensional Site risk map.

This electronic signal can be transmitted directly to the system or relayed from a central site security/safety control point and passed on to the emergency services. The system has means to read the incoming signal code and displays the appropriate icon in the correct location on the plan, map or three dimensional Site risk map. Download points are identified by the Data icon. For example, Fire Alarm 034 is triggered in Room 4, Second Floor of Process Building One, Interactive Chemicals. The alarm signal is sent via the hardwired or radio broadcast system to the central control unit at the Security Building. The safety or security officer relays the Information to the emergency services manually or it may be sent automatically via email, radio or microwave. The signal is received by the emergency services where it is identified by the system application and displayed as the appropriate flashing icon on screen.

The system is activated as described previously with the target site showing up as an expanding red circle. The specific alarm signal (i.e. Fire Alarm 034) is displayed within the red circle as a flashing icon. As each level of the 3D risk map is accessed on the system the triggered ammonia alarm remains flashing on screen at the correct location enabling the emergency services to navigate directly to the correct alarm location.

The user may click on the flashing icon to access more detailed information, such as the alarm type i.e. Fire, with a recorded audio sample of the claxon sound associated with the triggered alarm, this may be of particular benefit in complex sites where a multiplicity of complex and uncommon sensors may be in operation. Signals from remote devices such as CCTV cameras may be received and displayed on the system as a window on the screen. On sites that have sensor networks but do not have broadcast capability, the Emergency Services can plug the system into the sensor network at designated 'Data Ports' using Ethernet, LAN, short-range infrared (line of sight) transmission devices and the like. The system automatically displays the Data Port icon on-screen'to show the emergency services where they can plug into the on-site sensor systems.

Some sites with sensor networks may have internet websites capable of showing the on-site sensor networks. The system can access these websites via WAP mobile phones, FM receivers or other mobile web access devices. Live sensor data from sites can be downloaded from their websites and displayed on three dimensional Site risk map on the system. The Sensor Input facility provides the system user with a high level of emergency information at the earliest possible moment. For example, a system equipped Fire Tender responding to the sample alert at Interactive Chemicals can determine what form of hazard they are responding to, it's precise location on site and what ancillary hazards they should prepare for. A responding Emergency Services Unit using the system can utilise the transit time to prepare themselves, don appropriate equipment, devise their emergency strategy, order in further emergency services units and order local area evacuations.

Additional hazard icons on the risk maps may include hazardous building materials icons for asbestos, sandwich panels and the like. The system automatically displays a range of icons super-imposed onto the maps, plans or three dimensional Site risk maps on screen indicating where potentially hazardous building materials or structure types are in use. These icons may include the Fire Resistance time of the building materials according to official standards such as British Standard or Factory Mutual Insurance (L.P.C.B) written under each icon. By clicking on any of these Hazardous Building Material icons the user can bring up a Critical Time Calculator tool. This tool shows the Fire Resistance Time of the building material, it provides a Fire Start Time that the user can set and a Fire Temperature box (which can be linked to the site sensors) if available or the user can enter an estimated temperature manually. By clicking 'Calculate' button the system displays the estimated structural failure time.

Another hazard icon that may be provided is the Salvage icon which indicates where items of significant value that should be rescued are located. Salvage items may include cash, documents, artworks, data or valuable materials. Where salvage items are stored in secure or fire resistant locations such as safes, the Fire Resistance Time is shown. Where salvage items are secured in locked areas such as safes a 'Locked' icon appears on, below or beside the Salvage icon. The user may click on this icon to open an information page providing information on how the area or safe may be opened, such as the name & contact details of the key holder. In the case of digital data a 'download port' icon will be displayed to show where data may be downloaded. By clicking on the Download Port icon the user can access information on how the data may be accessed including the type of connection required, estimated data load, access codes etc.

Another useful tool is the deploy tool. The Deploy tool opens a menu listing the main emergency & security services (Fire Brigade, Police, Ambulance, on site ERTs). By selecting one of these groups the system displays a panel containing icons representing the personnel, equipment and vehicles common to that group. The user can drag any of these icons from the panel and drop it onto the plans, maps or 3D Site risk maps. For example: The police, responding to a siege at a bank can use the Deploy tool to show where personnel such as snipers, assault units, ambulances etc. should be or are located. Explosives, weapons, hostiles, civilians & casualties can also be placed onto the plans, maps or three dimensional risk map according to best intelligence. The user can also use a STATUS tool from the Deploy panel to change the status, i.e. wounded, captured, dead, of any icon deployed on screen. Where personnel; vehicles, equipment etc. that appear on the Deploy panel have Identity Cards stored on the Contact database the user can click on the on screen icon for that unit to access the appropriate Identity Card. The Deploy tool is designed to assist the user to visualise the situation and best deploy resources.

Another useful tool is the evacuate tool. The Evacuate tool is essentially a panic button. When selected from the Tools panel the user is presented with a text panel asking "Are You Sure You Want To Evacuate? YES/NO". If the user selects 'YES', a large flashing 'Evacuate' icon appears on screen. If the system terminal is connected to other system or other visual systems by radio, microwave, phone, ethernet etc. the Evacuate warning is broadcast to them and it automatically appears on those screens. An automated pre-recorded audio 'Evacuate' warning can be broadcast to all emergency services personnel in range.

The systems Command & Control is a tool that empowers any remote system terminal to become a master version of the application for use by the Officer In Command (OIC) at any given emergency situation. By entering a second level password into any system application, the O.I.C activates the Command & Control function. That specific system terminal becomes the system Command & Control unit. Once the OIC has activated the system Command & Control function he/she is presented with the 'COMMAND' tool. The 'COMMAND' tool allows the OIC to over-ride subordinate terminals within range to ensure that all personnel are using the correct features of the system, to draw attention to selected hazards or facilities and broadcast critical instructions such as 'Evacuate' to all emergency/security services on site. All subordinate terminals within range automatically display what the OIC is viewing on the system Command & Control terminal. Once the 'COMMAND' function has been disengaged by the OIC all sub-ordinate system terminals can resume independent activity.

In multi-jurisdictional situations where the command structure may change, for example: the Fire Brigade arrive and take control at the scene of a building fire. It becomes apparent that the fire is the result of terrorist activity. At this point the security services become the superceding authority on site. In this situation each system Command & Control unit can broadcast a 'Resign Authority' request to all other system Command & Control units. The 'Resign Authority' request appears automatically on all system Command & Control terminals in range. If the receiving OIC agrees to submit to the request he/she clicks the 'AGREE' button on screen. This brings up a second level password panel, once a correct password has been entered in this panel that terminal reverts to standard system functions and may be controlled from the new system Command & Control terminal.

A text tool may also be provided in the system. When selected from the Tool panel the Text tool brings up a text window on screen. The system user can write text messages by using a keyboard, number pad or other scripting method. The user can then select a recipient from a pull down menu that includes all terminals in range or other receivers and send them the text message. When a text message is sent to a terminal, the text panel opens automatically on screen, showing the message and identifying the sender. The Text tool also allows text messages to be sent to recipients not directly available to the system by typing in the recipients phone numbers or email address.

The system may also be used in a training mode. Training mode is a modified version of the application for user training & testing. Training mode offers all the main tools of the working version plus an interactive Question function that prompts the user to use the application to answer a wide range of questions relating to the three dimensional risk map. For example: The user may be prompted to "Click all Toxic materials in Building 23". The user is then presented with a selection of standard Hazard Icons. The user clicks on icons and is marked according to the answers given and timed with the Stopwatch tool. In some cases the user may not be able to progress to the next Question until the correct answers are given. The application compiles a final test score for the user. This can be printed for training records. As Training mode may be run on a standard desktop P.C with a keyboard some answers may be entered in writing. Training mode helps the user to develop an intimate knowledge of real three dimensional Risk Mapped sites, improves their ability to use the system to its full potential and provides a verifiable training record. Training mode may also be used as an emergency-planning tool allowing the emergency services, security services or in house personnel to simulate disaster scenarios and devise appropriate response plans.

Another tool that may be provided is the flow tool. This tool can be selected from the Tool pull down menu. When selected the Flow tool superimposes flow arrows representing the direction & approximate number of people that may take a designated route from an emergency situation. For example: Yellow indicates 1 to 20 people, blue 20-50, brown indicates 50-100, and so on. On sites where personnel have designated assembly areas individual Flow arrows may be shown terminating at the correct Assembly area. The correct total number of persons due to assemble at designated assembly points is shown on assembly point icons to help the emergency services to calculate evacuated personnel numbers and so identify the number of 'lost' persons. The Flow tool can be used by the emergency services to plan their access & exit strategy to a site, taking into account the obstruction that may be caused by people evacuating an area. The Flow tool is also of use to on-site safety training personnel in planning evacuation procedures and for on-site staff to learn the correct evacuation route.

Flow arrows can also take into account variables in personnel flows such as day or night shifts, peak arrival time (airports, train stations, public area rush hours). If variable flow data is available on the system, 'sun' & 'moon' icons representing shift periods or 'Rush-hour' icons representing peak personnel traffic periods appear on the Flow tool buttons. When selected, these tool modifiers show the estimated personnel flows appropriate to the time or shift. In circumstances where personnel evacuating a location may be physically impaired or handicapped, the flow arrows will flash on and off and icons representing 'slow moving persons' will appear on the flow arrows.

Another tool that may be provided is the dangerous inmates tool. This tool can be selected from the Tool pull-down menu. When selected the Dangerous Inmates tool superimposes icons onto the 3D Site risk maps indicating the location of dangerous inmates. This is of particular use in emergencies involving prisoners or mental patients in prison, hospitals, and the like. The user may also click on Dangerous Inmate icons to open Personal Identity Cards. This function will provide the user with detailed access to data about the dangerous patient in question, such as how the patent should be handled, supervising office/doctor contact details. Where special access is required a 'Locked' icon can be displayed on the Dangerous Inmate icon. When clicked this function allows the user to access data such as who the key holder is, medication or security precautions required.

One useful feature of the system is the unmovable persons feature. When selected from the Tool pull-down menu this tool superimposes 'Unmoveable Persons' icons onto the three dimensional risk map. This tool is intended to alert emergency services personnel to the presence & location of persons who cannot be moved. The Unmoveable Persons tool is intended to represent persons such as critically ill patients who may be seriously harmed or killed if moved or disconnected from life support or other medical machinery. The user may also click on Unmoveable Persons icons to open Personal Identity Cards. This function will provide the user with detailed access to data about the patient in question, such as how the patient should be handled, supervising doctor/nurse's contact details etc. A green Medical cross may be displayed on Unmoveable Persons Icons if additional data such as 'what equipment is needed to move the inmate' or 'how long the patient can be disconnected from medical appliances' is available. This data may be of particular use to emergency services medics in the evacuation of hospitals.

Where special access is required a 'Locked' icon can be displayed on the Unmoveable Inmates icon. When clicked this function allows the user to access data such as who the key holder is and the medication required. When an Individual Unmoveable Persons icon is clicked on screen an evacuation arrow may appear on the three dimensional Site risk map identifying the designated evacuation route for that Unmoveable Person. Secondary evacuation routes may also be shown as an alternative arrow.

One feature that may be provided is the line of sight feature. When selected from the Tool pull-down menu the Line Of Sight tool allows the user to touch the screen. The user can then drag his/her finger from the initial contact point across the screen. The system displays a dotted red line from the initial contact point to the point where the user breaks contact with the screen. The Line of Sight tool is designed to allow system users to identify points represented on a three dimensional Site risk map from where either emergency/security services personnel can see from or from where a hostile person may be able to target emergency/security services personnel from. A 'scope cone' may also be superimposed onto 3D Site risk maps indicating the range, angle of elevation and scope of view from a given point on a map.

One particularly useful tool is the access/egress tool. When selected from the Tool pull-down menu the Access/Egress tool superimposes icons on the three dimensional Site risk map indicating points of access to & from buildings such as doors, windows, accessible vents and chimneys. An accessibility rating code may be displayed on each. Access/Egress icon. These ratings inform the system user of the estimated strength of the access points (for example: a weak door may be rated '2' whereas a heavy security door may be rated '12'), These accessibility ratings may relate to the estimated time it may take to break through an access point. Additional data such as 'Cutting Gear Required' may be displayed on access points. Access accessibility ratings may be applied to all potential points of access/egress including doors, windows, vents and walls. Access/Egress icons may also have a 'Dimensions' symbol displayed. When clicked the Dimensions tool displays width & height data on screen. This is of particular use in emergency situations where the emergency/security services may need to know the dimensions of doorways, corridors and windows. By clicking on Access/Egress icons, the system can also provide detailed information on keyholders (names of the keyholder, contact details), password codes, lock types, time-lock information and connected alarm systems, for example.

Finally, the system may be provided with a search function. The Search function will allow the user to pull down menus listing relevant emergency information contained in three dimensional Site risk maps stored on the system. By selecting an item from the search menus for example 'Asbestos', the system will display all asbestos hazards on the site on screen. The Search menu can be divided into categories such as 'Hazardous Building Materials' etc. from which more specific items such as 'Asbestos' can be selected. Data selected from these menus is then displayed on the three dimensional Site risk map. The Search facility is designed to allow the system user to highlight specific hazards on screen. The search function also provides a link facility that allows system users to access external software applications, databases, etc. such as Hazmat, HazChem etc. and visa versa.

One further important feature that will be understood is that the method step of converting the architectural plans of a specific location into computer readable format includes but is not limited to converting the architectural plans, photographs, sketches, elevation views, plans and films of the specific location into computer readable format. Any such type of data may be used to form the three dimensional schematic representation.

It will be further understood that the invention, although primarily designed for use by the emergency services will also be of use to owner occupiers or other occupants of particular locations. Insurance auditors and environmental auditors could also obtain some benefit from the system described.

In the specification the terms "comprise, comprises, comprised and comprising" or any variation thereof and the terms "include, includes, included and including" or any variation thereof are considered to be totally interchangeable and they should all be afforded the widest possible interpretation.

The specification is not limited to the embodiments hereinbefore described but may be varied in both construction and detail within the scope of these claims.

The invention claimed is:

1. A risk mapping system for use in crisis management comprising:

a database having a plurality of risk maps stored thereon, hazard data associated with each risk map stored on the database, the hazard data associated with the plurality of the risk maps including a hazard icon superimposed on the risk map, means to access the database and select a particular risk map and associated hazard data, and means to display said selected risk map and associated hazard data including:

the plurality of the risk maps stored on the database being three-dimensional graphical representations of specific locations and in which, for each location having a three-dimensional risk map, there are provided a plurality of three dimensional risk maps of the location from different aspects of that location and in which for each specific location, there is provided an internal view risk map and an external view risk map, the internal view risk map including a view of the interior of the location permitting direction of emergency services personnel through the interior of the location, the external view risk map including a view of the exterior of the location including the height of the location and the physical appearance of the location thereby allowing a user of the risk mapping system to determine whether additional equipment is required, and the user accessing the risk map being diverted sequentially through a series of linked risk maps from the outermost view external view risk map to the innermost view internal view risk map.

2. The risk mapping system as claimed in claim 1, in which the means to display the selected risk map and associated hazard data further comprises means to select a particular three dimensional aspect view of a specific location having a plurality of three dimensional risk maps.

3. The risk mapping system as claimed in claim 1, in which there are additionally provided two dimensional risk maps of specific locations.

4. The risk mapping system as claimed in claim 1, in which the external view risk map further comprises hazard data relating to other locations within a predetermined radius of the selected location.

5. The risk mapping system as claimed in claim 1, in which the hazard icon representing hazard data may have further accessible data associated therewith.

6. The risk mapping system as claimed in claim 1, in which there are a plurality of risk maps for each aspect view of a particular location taken from different distances.

7. The risk mapping system as claimed in claim 1, in which there is provided a surrounding area map showing access routes linked to each risk map.

8. The risk mapping system as claimed in claim 1, in which there is provided a perimeter zone map displaying a predetermined distance perimeter zone surrounding a desired location linked to each risk map.

9. The risk mapping system as claimed in claim 1, in which a neighbor area map showing nearby buildings is linked to each risk map.

10. The risk mapping system as claimed in claim 9, in which a neighbor building which stores hazardous materials is given a hazard icon.

11. The risk mapping system as claimed in claim 1, in which there is provided an internal view risk map for each floor of the particular location and in which each floor may be accessed one at a time.

12. The risk mapping system as claimed in claim 1, in which the specific location comprises a building.

13. The risk mapping system as claimed in claim 12, in which there is provided contact details for each building shown in the risk map.

14. The risk mapping system as claimed in claim 1, in which the system is linked to an existing legacy G.I.S. system.

15. The risk mapping system as claimed in claim 1 in which the system is linked to a Global Positioning System (GPS).

16. The risk mapping system as claimed in claim 1 in which the database is located remote from the means to access the database and select a particular risk map and associated hazard data and the means to display said selected risk map and associated hazard data.

17. The risk mapping system as claimed in claim 1 in which the means to access the database and select a particular risk map and associated hazard data and the means to display said selected risk map are located remote from the database.

18. The risk mapping system as claimed in claim 1, in which individual buildings on risk maps may be color coded to indicate types of materials contained therein.

19. The three dimensional risk map for storage in the database of the risk mapping system of claim 1, the three dimensional risk map having hazard data associated therewith, the hazard data comprising a hazard icon superimposed on the three dimensional risk map.

* * * * *